US009386057B2

(12) United States Patent
Kent et al.

(10) Patent No.: US 9,386,057 B2
(45) Date of Patent: Jul. 5, 2016

(54) APPLICATION STREAMING AND EXECUTION SYSTEM FOR LOCALIZED CLIENTS

(71) Applicant: Numecent Holdings Ltd., Irvine, CA (US)

(72) Inventors: Osman Kent, Surrey (GB); Arthur S. Hitomi, Huntington Beach, CA (US)

(73) Assignee: Numecent Holdings, Inc., Irvine, CA (US)

( * ) Notice: Subject to any disclaimer, the term of this patent is extended or adjusted under 35 U.S.C. 154(b) by 247 days.

(21) Appl. No.: 13/745,417

(22) Filed: Jan. 18, 2013

(65) Prior Publication Data

US 2014/0136601 A1    May 15, 2014

Related U.S. Application Data

(60) Provisional application No. 61/588,102, filed on Jan. 18, 2012.

(51) Int. Cl.
*G06F 15/16* (2006.01)
*H04L 29/06* (2006.01)
*H04L 29/08* (2006.01)

(52) U.S. Cl.
CPC ............ *H04L 65/60* (2013.01); *H04L 65/4084* (2013.01); *H04L 65/605* (2013.01); *H04L 67/02* (2013.01); *H04L 67/2861* (2013.01); *H04L 67/289* (2013.01); *H04L 67/2842* (2013.01)

(58) Field of Classification Search
CPC .... H04L 65/60; H04L 65/605; H04L 65/4084
USPC ................... 709/203, 205, 206, 224
See application file for complete search history.

(56) References Cited

U.S. PATENT DOCUMENTS 5,860,012 A    1/1999  Luu
6,324,690 B1   11/2001 Luu
(Continued)

OTHER PUBLICATIONS

Andreas Ahlund, "An approach towards User-centric Application Mobility", Aug. 28, 2009, Master's Thesis in Computing Science, Umea University Department of Computing Science.*

(Continued)

*Primary Examiner* — Vivek Srivastava
*Assistant Examiner* — Normin Abedin
(74) *Attorney, Agent, or Firm* — Sheppard, Mullin, Richter & Hampton LLP

(57) ABSTRACT

For various implementations, a first application streaming client can obtain portions of an application from a application streaming server, execute the application based on those portions obtained, and provide a second application streaming client (a pixel-based application streaming client) access to the executing application using a pixel stream generated based on output from the executing application. Depending on the implementation, the first application streaming client could execute the application, based on the portions obtained, on behalf of a user at the application streaming client, on behalf of the pixel-based application streaming client, or both. In various implementations, the first application streaming client and the second application streaming client can be communicatively coupled through a local network (e.g., LAN or local WiFi), while the first application streaming client and the application streaming server can be communicatively coupled through a wider area network (e.g., WAN or MAN).

19 Claims, 5 Drawing Sheets

(56) References Cited

U.S. PATENT DOCUMENTS

| | | |
|---|---|---|
| 6,343,313 B1 | 1/2002 | Salesky et al. |
| 6,886,169 B2 | 4/2005 | Wei |
| 6,917,963 B1 | 7/2005 | Hipp et al. |
| 6,944,858 B2 | 9/2005 | Luu |
| 7,210,147 B1 | 4/2007 | Hipp et al. |
| 7,240,162 B2 | 7/2007 | de Vries |
| 7,522,664 B1 | 4/2009 | Bhaskar et al. |
| 7,577,751 B2 | 8/2009 | Vinson et al. |
| 8,117,600 B1 | 2/2012 | Roeck et al. |
| 8,645,946 B2 | 2/2014 | Wookey |
| 8,667,482 B2 | 3/2014 | Bernardi |
| 8,712,959 B1 | 4/2014 | Lim et al. |
| 8,768,800 B2 | 7/2014 | Milosavljevic et al. |
| 2001/0034736 A1 | 10/2001 | Eylon et al. |
| 2003/0004882 A1 | 1/2003 | Holler et al. |
| 2003/0140089 A1 | 7/2003 | Hines et al. |
| 2003/0226138 A1 | 12/2003 | Luu |
| 2004/0024845 A1 | 2/2004 | Fishhaut et al. |
| 2005/0198647 A1 | 9/2005 | Hipp et al. |
| 2006/0083308 A1 | 4/2006 | Schwarz et al. |
| 2006/0122937 A1 | 6/2006 | Gatto et al. |
| 2007/0083645 A1 | 4/2007 | Roeck et al. |
| 2007/0254742 A1 | 11/2007 | O'Brien |
| 2008/0005349 A1 | 1/2008 | Li et al. |
| 2008/0120129 A1 | 5/2008 | Seubert et al. |
| 2008/0163202 A1 | 7/2008 | Kembel et al. |
| 2008/0165280 A1 | 7/2008 | Deever et al. |
| 2008/0222659 A1 | 9/2008 | Brumme |
| 2008/0228865 A1 | 9/2008 | Cruzada |
| 2008/0301280 A1 | 12/2008 | Chasen et al. |
| 2009/0109213 A1 | 4/2009 | Hamilton, II |
| 2009/0158311 A1 | 6/2009 | Hon et al. |
| 2009/0203368 A1* | 8/2009 | Marsyla et al. ............... 455/418 |
| 2009/0204711 A1 | 8/2009 | Binyamin et al. |
| 2010/0070526 A1 | 3/2010 | Matias |
| 2010/0138475 A1 | 6/2010 | Frank et al. |
| 2010/0235112 A1 | 9/2010 | Kesler et al. |
| 2010/0235153 A1 | 9/2010 | Sharp et al. |
| 2010/0250670 A1 | 9/2010 | Wei |
| 2010/0333085 A1 | 12/2010 | Criddle et al. |
| 2011/0063500 A1 | 3/2011 | Loher et al. |
| 2011/0066570 A1 | 3/2011 | Kolo et al. |
| 2012/0066286 A1 | 3/2012 | Heredia et al. |
| 2012/0110131 A1 | 5/2012 | Villagas Nunez et al. |
| 2012/0144386 A1 | 6/2012 | Wookey |
| 2012/0278439 A1* | 11/2012 | Ahiska ................ A63F 13/12 709/218 |
| 2012/0297311 A1 | 11/2012 | Duggal |
| 2013/0007227 A1 | 1/2013 | Hitomi et al. |
| 2013/0045759 A1 | 2/2013 | Smith |
| 2013/0073775 A1 | 3/2013 | Wade et al. |
| 2014/0068022 A1 | 3/2014 | Kshirsagar et al. |
| 2014/0169471 A1 | 6/2014 | He |

OTHER PUBLICATIONS

Ahlund, Andreas, "An Approach Toward User-Centric Application Mobility," Master's Thesis in Computing Science, Umea University, Umea, Sweden, Aug. 28, 2009 [retrieved online at http://www8.cs.umu.se/education/examina/Rapporter/AndreasAhlund.pdf on Apr. 22, 2013].

International Application No. PCT/US2013/022295, International Search Report and Written Opinion mailed Apr. 15, 2013.

International Application No. PCT/US2013/059316, International Search Report and Written Opinion mailed Mar. 20, 2014.

* cited by examiner

APPLICATION STREAMING AND EXECUTION SYSTEM FOR LOCALIZED CLIENTS

CROSS-REFERENCE TO RELATED APPLICATIONS

The present application claims benefit of U.S. Provisional Patent Application No. 61/588,102 filed Jan. 18, 2012, which is incorporated by reference herein.

BACKGROUND

An area of ongoing research and development is application delivery to computing devices. One aspect of application delivery is speed. Current application delivery platforms enable a device to download an application, which takes as much time as is required to accomplish the download, followed by an installation time. When the application is delivered from a relatively remote source, additional issues arise.

Another aspect of application delivery is security. Not all application delivery platforms offer the same amount of security in application delivery, piracy prevention, or the like. Other aspects of application delivery include network utilization, reduced power requirements for devices to which applications are delivered (and potentially for devices from which applications are delivered), and application and operating system performance consistency.

Downloading and installing an application is a simple way to obtain performance consistency, but this technique has other shortcomings. For example, there is often no effective piracy prevention in the delivery mechanism (though there can be piracy prevention through other techniques). This technique also means the device onto which the application is delivered must be capable of storing the application and running the application with sufficient speed such that users are not bothered by the performance. Network utilization is also limited to controlling the download, which essentially only impacts download times for a device without necessarily enabling load balancing to improve performance of all devices. These weaknesses with standard download/install have led to continuing research into virtual application delivery solutions.

An area of ongoing research and development is asset delivery to computing devices, particularly devices largely designed to provide functionality based through a network connected (hereafter, referred to as "connected devices"), such as smart phones, tablets, and the like.

SUMMARY

The following implementations and aspects thereof are described and illustrated in conjunction with systems, tools, and methods that are meant to be exemplary and illustrative, not necessarily limiting in scope. In various embodiments, one or more of the above-described problems have been addressed, while other embodiments are directed to other improvements.

For various implementations, a first application streaming client can obtain portions of an application from a application streaming server, execute the application based on those portions obtained, and provide a second application streaming client (a pixel-based application streaming client) access to the executing application using a pixel stream generated based on output from the executing application. Depending on the implementation, the first application streaming client could execute the application, based on the portions obtained, on behalf of a user at the application streaming client, on behalf of the pixel-based application streaming client, or both. In various implementations, the first application streaming client and the second application streaming client can be communicatively coupled through a local network (e.g., LAN or local WiFi), while the first application streaming client and the application streaming server can be communicatively coupled through a wider area network (e.g., WAN or MAN).

The foregoing examples of the related art and limitations related therewith are intended to be illustrative and not exclusive. For example, wireless clients may use different protocols other than WiFi (or IEEE 802.11), potentially including protocols that have not yet been developed. However, problems associated with performance may persist. Other limitations of the relevant art will become apparent to those of skill in the art upon a reading of the specification and a study of the drawings.

DETAILED DESCRIPTION

Figure 1:
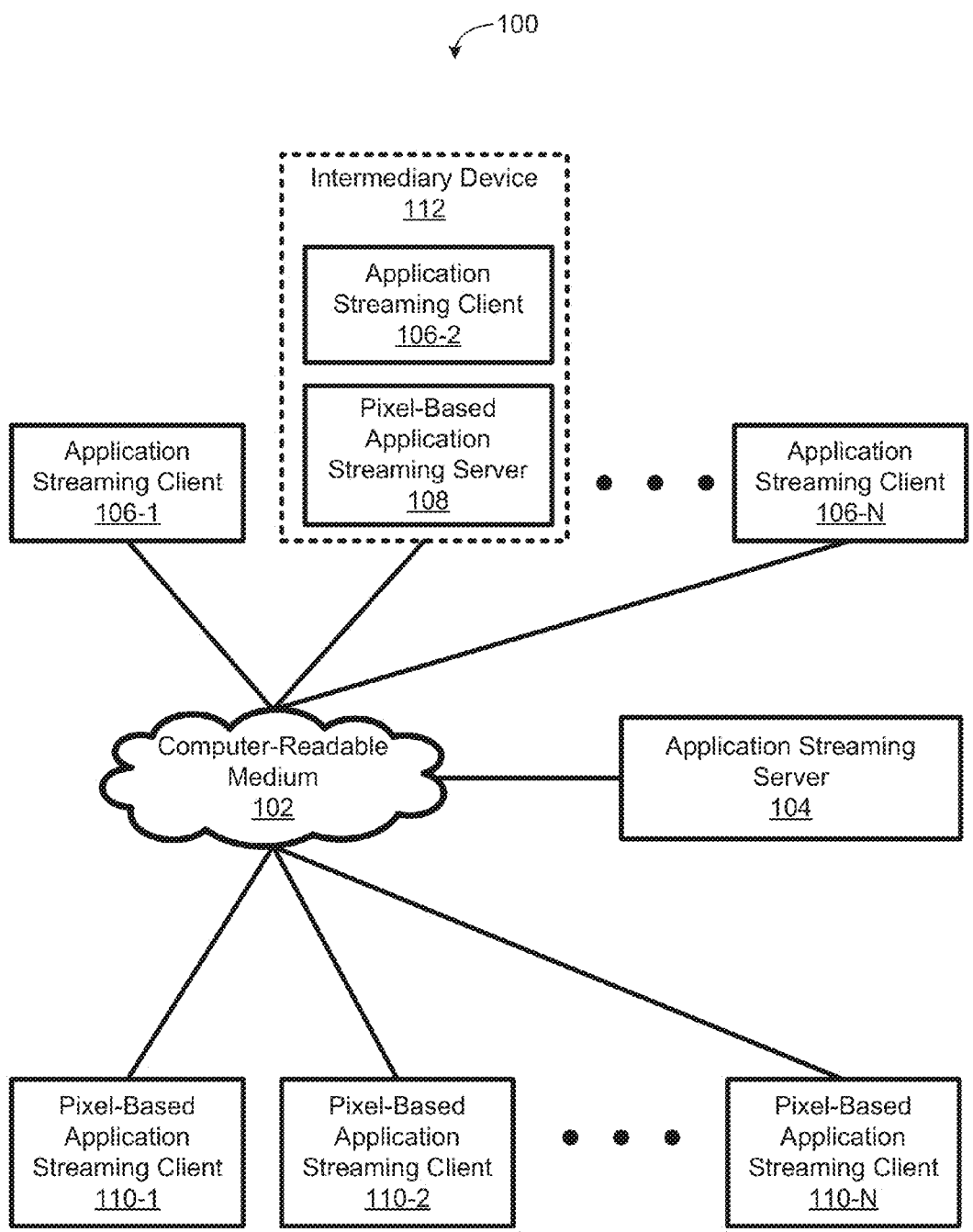
FIG. 1 depicts a diagram of an example of an application streaming system.

FIG. 1 depicts a diagram 100 of an example of an application streaming system. In the example of FIG. 1, the diagram 100 includes a computer-readable medium 102, an application streaming server 104, application streaming clients 106-1 to 106-N (collectively referred to as "application streaming clients 106"), a pixel-based application streaming server 108, and pixel-based application streaming clients 110-1 to 110-N (collectively referred to as "pixel-based application streaming clients 110"). For illustrative purposes, an intermediary device 112 is included in the diagram 100 to show that, e.g., the application streaming client 106-2 can be implemented on a device on which the pixel-based application streaming server 108 is also implemented. Other pixel-based application streaming servers (not shown) could be implemented on other intermediary devices (not shown) along with other ones of the application streaming clients 106.

The computer-readable medium 102, and any other computer-readable medium in this paper, is intended to include a statutory medium (e.g., in the United States, under 35 U.S.C. 101), and to specifically exclude mediums that are non-statutory in nature to the extent the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

When implemented as or to include a network, the computer-readable medium 102, and any other applicable computer-readable medium in this paper, may include practically any type of communications network, such as the Internet or an infrastructure network. The term "Internet" as used in this paper refers to a network of networks that use certain protocols, such as the TCP/IP protocol, and possibly other protocols, such as the hypertext transfer protocol (HTTP) for hypertext markup language (HTML) documents that make up the World Wide Web ("the web"). For example, the computer-readable medium 102 can include one or more wide area networks (WANs), metropolitan area networks (MANs), campus area networks (CANs), or local area networks (LANs); theoretically, the computer-readable medium 102 could be a network of any size or characterized in some other fashion. Networks can include enterprise private networks and virtual private networks (collectively, "private networks"). As the name suggests, private networks are under the control of a single entity. Private networks can include a head office and optional regional offices (collectively, "offices"). Many offices enable remote users to connect to the private network offices via some other network, such as the Internet. The example of FIG. 1 is intended to illustrate a computer-readable medium 102 that may or may not include more than one private network.

As used in this paper, the term "computer-readable medium" is intended to include physical media, such as would comprise a network, memory or a computer bus. Accordingly, in some instances, the computer-readable medium can permit two or more computer-based components to communicate with each other. For example, as shown in FIG. 1, the computer-readable medium 102 can include a network, which can couple together the application streaming server 104, the application streaming clients 106, the pixel-based application streaming clients 108, and the pixel-based application streaming server 110. Through the computer-readable medium 102, the application streaming server 104, the application streaming clients 106, the pixel-based application streaming clients 108, and the pixel-based application streaming server 110 can communicate with one another, if applicable.

In the example of FIG. 1, the application streaming server 104 is coupled to the computer-readable medium 102. In the example of FIG. 1, the application streaming server 104 provides an application streaming client with data (e.g., portions of a stream-enabled application) that enables the application streaming client to execute the stream-enabled application.

As understood herein, a "stream-enabled application" is an application (e.g., conventionally-coded application) that is broken into portions (e.g., blocks, chunks, pages, etc.), such that the application can be streamed on a per-portion basis to an application streaming client and the application streaming client can execute the application based on the streamed portions. For various implementations, the application streaming client can initiate execution of a stream-enabled application once it has received a sufficient number of portions (e.g., portions received reach or surpass an executable threshold). As it continues execution of the stream-enabled application, the application streaming can request, and subsequently receive, additional portions of the stream-enabled application that the application streaming client does not already possess but possibly needs to continue the execution of the application. Generally, an application streaming server, which comprises some or all of the portions of the stream-enabled application, fulfills requests by application streaming clients for additional portions of the stream-enabled application. Applications that can be stream-enabled can include games, document-based software (e.g., word processing or spreadsheets), operating systems, image-based software, video-based software, and the like.

In the example of FIG. 1, the application streaming clients 106 are coupled to the computer-readable medium 102. In the example of FIG. 1, the application streaming server 104 can provide the application streaming clients 106 with data (e.g., portions of a stream-enabled application) that enables the application streaming clients 106 to execute the stream-enabled application, if the application streaming clients are appropriately configured. Depending on the implementation, the application streaming clients 106 can execute a stream-enabled application for use by users local to the applications streaming clients 102, for providing a pixel-based application streaming client with pixel-data for access ("pixel-based access") to the executed stream-enabled application, or both. For some implementations, the pixel-based access can comprise providing a pixel stream, generated based on the executing stream-enabled application, to the pixel-based streaming client. The pixel stream can be directly generated by the stream-enabled application as it executed, or can be generated by way of a pixel-based application streaming server.

In the example of FIG. 1, the pixel-based application streaming server 108 is coupled to the computer-readable medium 102. Depending on the implementation, the pixel-based application streaming server 108 can be implemented on the intermediary device 112 along with, e.g., the application streaming client 106-2, as shown for illustrative purposes in FIG. 1, or can be implemented on a device on which none of the application streaming clients 106 are implemented. The pixel-data associated with an executing stream-enabled application and served by the pixel-based application streaming server 108 can be based on output produced by the stream-enabled application as it is executed. Depending on the implementation, the pixel-based access can be facilitated using existing, pixel-based remote computing technologies, such as Remote Desktop Protocol (RDP), Remote Graphics Software (RGS), and the like.

In the example of FIG. 1, the pixel-based application streaming clients 110 are coupled to the computer-readable medium 102. In the example of FIG. 1, the pixel-based application streaming server 108 can provide pixel-based access of a stream-enabled application to pixel-based application streaming clients 110. For some implementations, the pixel-based application streaming server 108 can be employed to provide pixel-based access based on the stream-enabled application executing on, e.g., the application streaming client 106-2. Upon receiving the pixel-based access to the executing stream-enabled application, the pixel-based application streaming clients 110 can locally display a video-based output, at the pixel-based application streaming clients 110, based on pixel-data received.

In some implementations, the pixel-based application streaming server 108 can use resources of the intermediary device 112, such as local computing resources (e.g., graphics processing unit—GPU), to execute a stream-enabled application on behalf of a subset of the pixel-based application streaming clients 110. There are additional advantages with this approach when the subset comprises one or more of the pixel-based application streaming clients 110 that are in close network distance to the intermediary device 112. In this way, various implementations can shift the source of pixel streaming to somewhere closer to the pixel-based applications streaming clients 110 on the network, and can obviate the need for GPU-equipped servers in some instances (e.g., traditional pixel-based game streaming).

For illustrative purposes, the application streaming server 104 is described in this example as serving content. Accordingly, in this example, the application streaming server 104 can be referred to as a content server. A web server, which is one type of content server, is typically at least one computer system that operates as a server computer system and is configured to operate with the protocols of the World Wide Web and is coupled to the Internet. Unless context dictates otherwise, a server as used in this paper includes at least a portion of a computer system running server software.

Unless context dictates otherwise, a "server" as used in this paper includes at least a portion of a computer system running server software. Likewise, unless stated otherwise, a "client" as used in this paper includes at least a portion of a computer system running client software. A "computer system," as used in this paper, is intended to be construed broadly. In general, a computer system will include a processor, memory, non-volatile storage, and an interface. A typical computer system will usually include at least a processor, memory, and a device (e.g., a bus) coupling the memory to the processor.

The "processor" can be, for example, a general-purpose central processing unit (CPU), such as a microprocessor, or a special-purpose processor, such as a microcontroller.

The "memory" can include, by way of example but not limitation, random access memory (RAM), such as dynamic RAM (DRAM) and static RAM (SRAM). The memory can be local, remote, or distributed. As used in this paper, the term "computer-readable storage medium" is intended to include only physical media, such as memory. As used in this paper, a computer-readable medium is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

The bus can also couple the processor to the non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. The I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. Interfaces enable computer systems and other devices to be coupled together in a network.

Figure 2:
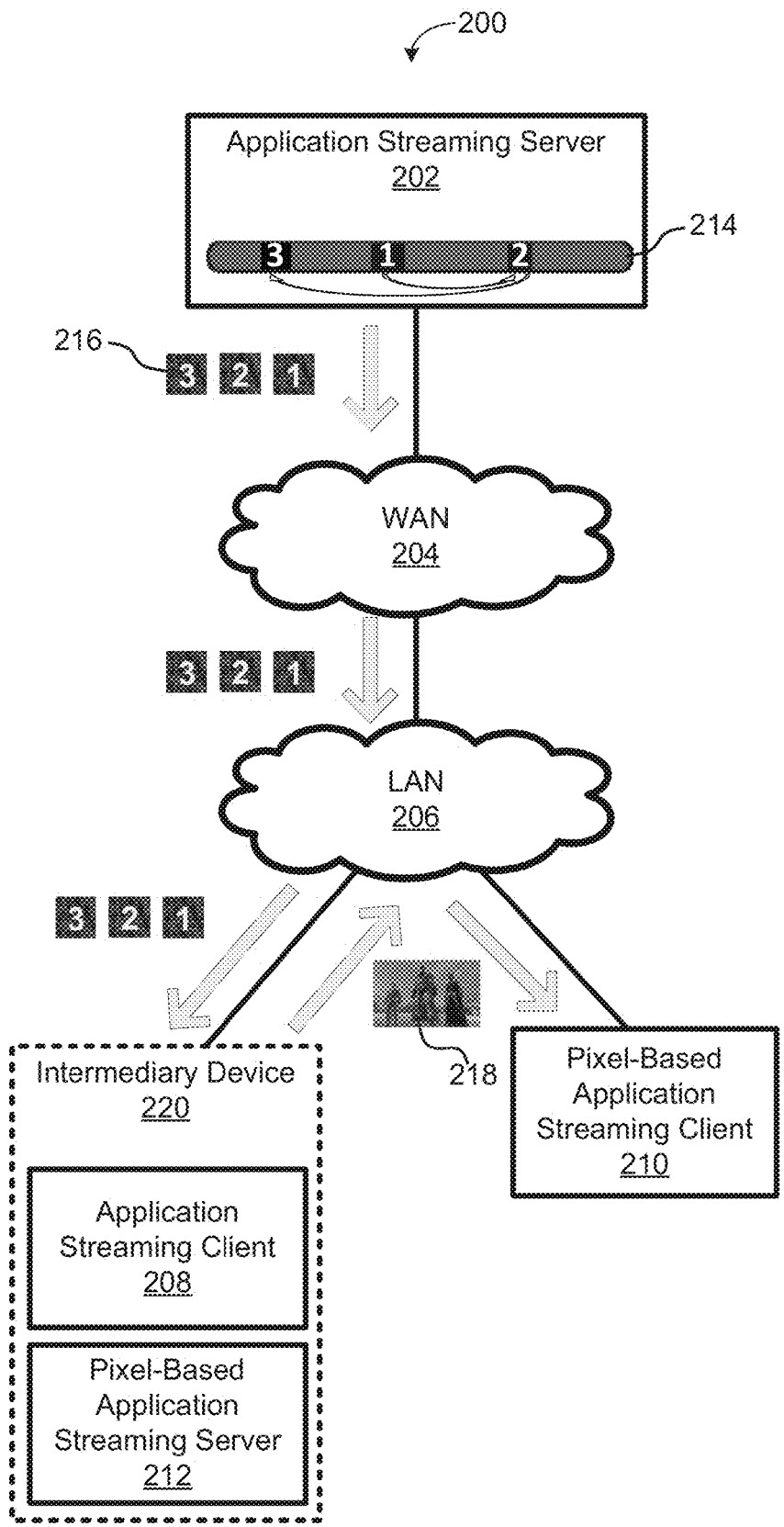
FIG. 2 depicts a diagram of an example of an application streaming system.

FIG. 2 depicts a diagram of an example of an application streaming system. In the example of FIG. 2, the diagram 200 includes an application streaming server 202, a WAN 204, a LAN 206, an application streaming client 208, an pixel-based application streaming client 210, and a pixel-based application streaming server 212. For illustrative purposes only, the application streaming client 208 and the pixel-based application streaming server 212 are depicted as implemented on an intermediary device 220, but in alternative implementations, the application streaming client 208 and the pixel-based application streaming server 212 could be implemented on separate devices.

In FIG. 2, the application streaming server 202 and the LAN 206 are coupled to the WAN 204, and the application streaming client 208, the pixel-based application streaming client 210, and the pixel-based application streaming server 212 are coupled to the LAN 206. The WAN 204 and the LAN 206 represent just two examples of computer-readable mediums that facilitate communication between the various entities shown in FIG. 2. For example, through the WAN 204 and the LAN 206, the application streaming server 202 can communicate with application streaming client 208. Likewise, through the LAN 206, the pixel-based application streaming server 212 can communicate with the pixel-based application streaming client 210.

Different implementations can utilize different configurations of computer-readable mediums to facilitate communication between various components. For example, in the alternative in which the application streaming client 208 and the pixel-based application streaming server 212 are implemented on distinct devices, the application streaming client 208 and the pixel-based application streaming server 212 can communicate via the LAN 206 or some other computer-readable medium (not shown). As another example, the pixel-based application streaming server 212 and the pixel-based application streaming client 210 can communicate via an infrastructure or ad hoc wireless network.

In the example of FIG. 2, the application streaming server 202 comprises a stream-enabled application 214, which is an application (e.g., conventionally-coded application) that is broken into portions (e.g., blocks, chunks, pages, etc.), such that the application can be streamed on a per-portion basis to an application streaming client and the application streaming client can execute the application based on the streamed portions. For example, as shown in FIG. 2, the application streaming server 202 can stream portions 1, 2, 3 (referred to as "portions 216") to the application streaming client 208 through the WAN 204 and the LAN 206. Assuming that the portions 216 are enough for the application streaming client 208 to initiate execution of the stream-enabled application 214, the application streaming client 208 can do so upon receiving the portions 216. If, however, additional portions of the stream-enabled application 216 are needed before the stream-enabled application 216 can be initiated, the application stream client 208 can request, and subsequently receive, those portions from the application streaming server 202 (e.g., until the portions received reach or surpass an executable threshold for the stream-enabled application 214).

As the application streaming client 208 executes the stream-enabled application 214 (e.g., based on the portions it requests and receives from the application streaming server 202), the pixel-based application streaming server 212 can generate a pixel stream based on the output produced by the executing stream-enabled application. Through the LAN 206, the pixel-based application streaming server 212 can provide the pixel-based applications streaming client 210 with the generated pixel stream 218. The pixel-based application streaming client 210, in turn, can utilize the generated pixel stream 218 to gain pixel-based access to the stream-enabled application 214 executing on the application streaming client 208. By providing pixel-based access in this manner, some implementations allow the source of pixel-based access to be shifted from GPU-equipped servers that execute an application behalf of a client, to a GPU-equipped application streaming client that is typically located in closer network distance to the client receiving access than the GPU-equipped servers.

Figure 3:
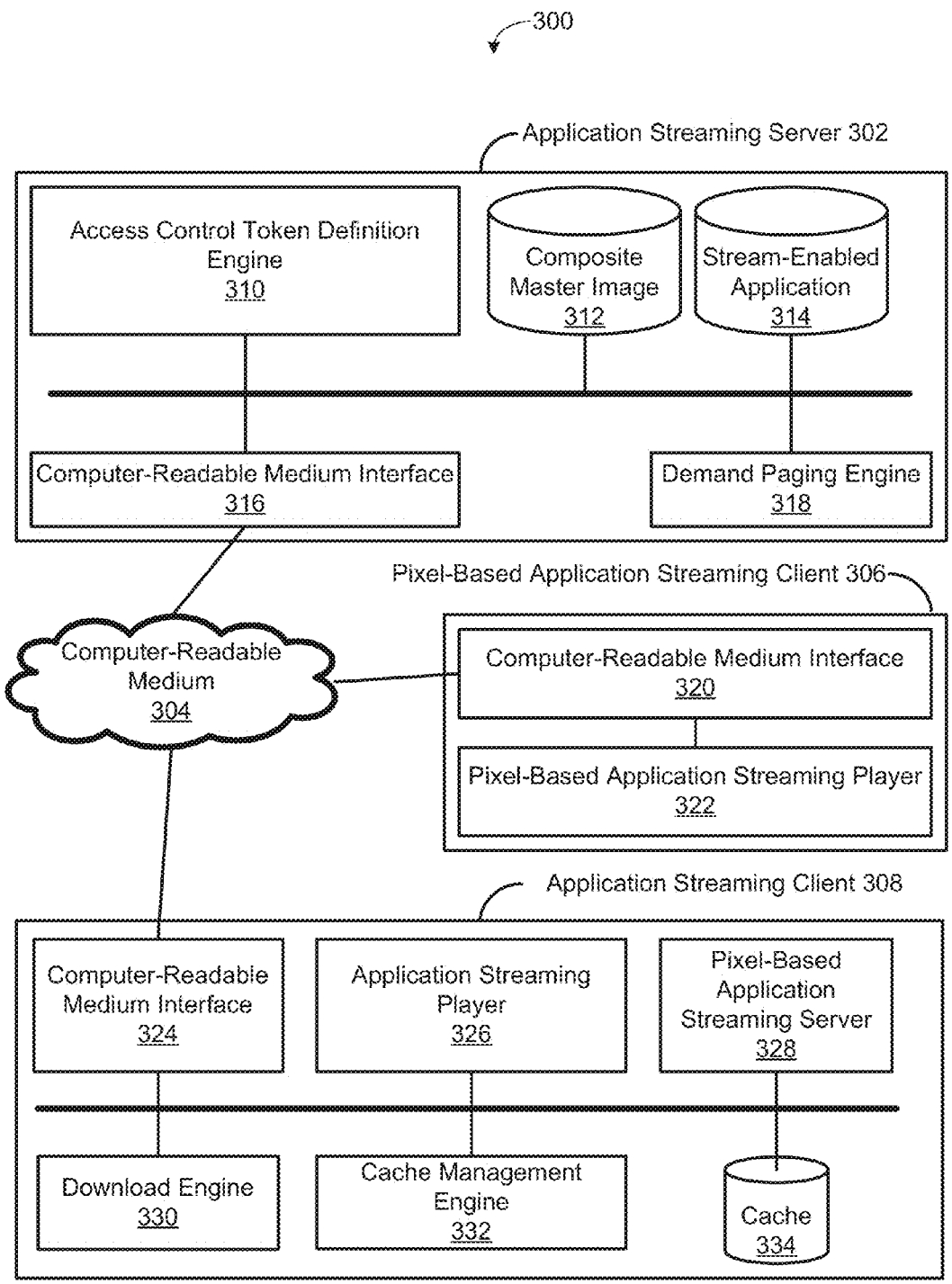
FIG. 3 depicts a diagram of an example of an application streaming system.

FIG. 3 depicts a diagram 300 of an example of an application streaming system. In the example of FIG. 3, the diagram 300 includes an application streaming server 302, a computer-readable medium 304, a pixel-based application streaming client 306, and an application streaming client 308. In some instances, the computer-readable medium 304 can permit two or more computer-based components to communicate with each other. For example, as shown in FIG. 3, the computer-readable medium 304 can include a network, which can couple together, and facilitate communication between, the application streaming server 302, the pixel-based application streaming client 306, and the application streaming client 308.

In the example of FIG. 3, the application streaming server 302 includes an access control token definition engine 310 a composite master image datastore 312, a stream-enabled application datastore 314, a computer-readable medium interface 316, and a demand paging engine 318. The computer-readable interface 316 can be implemented as an applicable known or convenient interface sufficient to enable the application streaming server 302 communication with or through the computer-readable medium 304. For example, where the computer-readable medium 304 includes a network, the computer-readable medium interface 316 could include a wired or wireless network interface card (NIC).

The demand paging engine 318 is responsible for streaming portions of a stream-enabled application (e.g., to the application streaming client 308) using a demand paging technique. As used in this paper, an "engine" includes a dedicated or shared processor and, typically, firmware or software modules that are executed by the processor. Depending upon implementation-specific or other considerations, an engine can be centralized or its functionality distributed. An engine can include special purpose hardware, firmware, or software embodied in a computer-readable medium for execution by the processor.

The composite master image datastore 312 includes one or more images that can be provided to the application streaming clients 308. The images include application snapshots on top of a machine. Thus, the images can be referred to as "application snapshots." Application snapshots can be made portable across at least some machines (or OSs if the application is sufficiently neutral, such as Java®). A snapshot engine (not shown) can take an initial snapshot of an environment before the application is run (unless the snapshot engine has access to an installation file from which an application install can be deconstructed, such as Android) then after installation in the cloud. The resultant package, the application snapshot, can be invoked on a device or in the cloud using the environment snapshot, if needed.

A datastore can be implemented, for example, as software embodied in a physical computer-readable medium on a general- or specific-purpose machine, in firmware, in hardware, in a combination thereof, or in an applicable known or convenient device or system. Datastores in this paper are intended to include any organization of data, including tables, comma-separated values (CSV) files, traditional databases (e.g., SQL), or other applicable known or convenient organizational formats. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure.

The demand paging engine 318 can deliver partial or full images from the composite master image datastore 312 to the application streaming client 308, including application snapshots. For some implementations, the demand paging engine 318 can also providing the application streaming client 308 with portions (e.g., jumpstart, prefetch, and/or predicted) of the stream-enabled application of an application that the application streaming client 308 is executing or is intending to execute. Accordingly, the demand paging engine 318 can, in some implementations, fulfill request for portions of stream-enabled application as they are received from the application streaming client 308. The demand paging engine 318 can provide the portions of the stream-enabled application from the stream-enabled application datastore 314.

The access control token definition engine 310 generates tokens to define access policies for the application streaming client 308. In a specific implementation, the access control includes digital rights management (DRM) functionality.

In the example of FIG. 3, the pixel-based application streaming client 306 includes a computer-readable medium interface 324, and a pixel-based application streaming player 322. The computer-readable medium interface 324 can be implemented as an applicable known or convenient interface sufficient to enable the application streaming client 308 to communicate with or through the computer-readable medium 304.

The pixel-based application streaming player 322 can provide pixel-based access to a stream-enabled application executing at an application streaming client (e.g., the application streaming client 308), possibly on behalf of the pixel-based application streaming client 306. In providing pixel-based access, the pixel-based application streaming player 322 can receive from the application streaming client 308 a pixel stream based on output from the stream-enabled application executing at the application streaming client 308. The pixel-based application streaming player 322 can further display the pixel stream to a user at the pixel-based application stream client 306, for example, via a video display coupled to the client 306. For some implementations, the pixel-based application streaming player 322 can also facilitate receiving input at the pixel-based application streaming client 306, and providing the received input to the application streaming client executing the stream-enabled application (e.g., the application streaming client 308).

In the example of FIG. 3, the application streaming client 308 includes a computer-readable medium interface 324, an application streaming player 326, a pixel-based application streaming server 328, a download engine 330, a cache management engine 332, and a cache 334 datastore. The application streaming client 308 can also include a file system driver (FSD) (not shown), for example, to facilitate the application streaming player's 326 access to portions of the stream-enabled application (e.g., file resources of the application) during application executing. The computer-readable medium interface 324 can be implemented as an applicable known or convenient interface sufficient to enable the application streaming client 308 to communicate with or through the computer-readable medium 304.

The download engine 330 can obtain an application snapshot from the application streaming server 302. The application snapshot informs the application streaming client 308 of what characteristics the application would have if installed on the application streaming client 308. The application snapshot also assists the application streaming client 308 with identifying what portions of the stream-enabled application are needed for the application to execute on the application streaming client 308 as if the applicable application is installed on the application streaming client 308. This enables the applications streaming client 308 to act as if the applicable application is installed on the application streaming client 308 even when it is not. The download engine 330 can also obtain jumpstart partials, which include portions of the stream-enabled application that allow execution of the application to initiate and/or that have been determined to cause potential delay if not downloaded before the start of the streamed application (e.g., portions of the application that are inevitably run during an early part of an application's execution). The download engine 330 can include a content prefetcher that obtains portions of the streamed application in anticipation of needing the portions soon, or at least at some point in the future. The sensitivity of the content prefetcher (i.e., the probability that a portion of an application will be considered "likely" to be used soon or at least at some point in the future) can be configurable or unconfigurable, depending upon the implementation.

The application streaming player 326 can run the stream-enabled application as if it were installed on the application streaming client 308. As used in this paper, installed is intended to mean "fully installed" such that executing the streamed application would not result in a system crash if an uninstalled portion of the application were accessed. As used in this paper, an application is intended to mean an executable (not simply data) program with at least one branch instruction. Due to the implementation of the downloaded application snapshot, the application streaming player 326 "thinks" that the application is installed on the machine. In addition, the application streaming player 326 can capture requests for portions of the streamed application (or data) that are not locally available and instruct the download engine 330 to obtain the portions of the streamed application that are not locally available.

In a specific implementation, the application streaming player 326 implements an access control policy from the application streaming server 302. The application streaming player 326 can enforce, for example, DRM policies.

The cache management engine 332 can manage the cache datastore 334 to enable the application streaming player 326 to satisfy requests using portions of the streamed application in the cache datastore 334. The download engine 330 can provide additional portions of the streamed application to the cache datastore 334 over time. The cache management engine 332 can clear portions of the cache datastore 334 over time in accordance with a cache management protocol (e.g., older entries can be deleted before newer entries).

The pixel-based application streaming server 328 can generate a pixel stream based on the output from the stream-enabled application being executed by the application streaming player 326, and can provide the generated pixel stream to the pixel-based application streaming client 306. In certain implementations, the pixel-based application streaming server 328 can generate the pixel stream based on the video output generated by the stream-enabled application as it executes, but other forms of outputs could also be utilized in the pixel stream generations. The pixel-based application streaming server 328 can utilize applicable known or convenient pixel streaming technologies in generating the pixel stream, including Remote Desktop Protocol (RDP), Remote Graphics Software (RGS), and the like. The pixel-based application streaming server can also receive, from the pixel-based application client 306, input (e.g., user-based input) associated with the stream-enabled application being executed and pixel-streamed to the pixel-based application streaming 306. The pixel-based application streaming server 328 can provide the input to the application streaming player 326, which, in turn, could provide them to the executing stream-enabled application. The executing stream-enabled application could act upon the input provided, the video output being provided to the pixel-based application streaming server 328 could change to reflect the action, and the pixel stream being generated by the pixel-based application streaming server 328 could also change accordingly.

Figure 4:
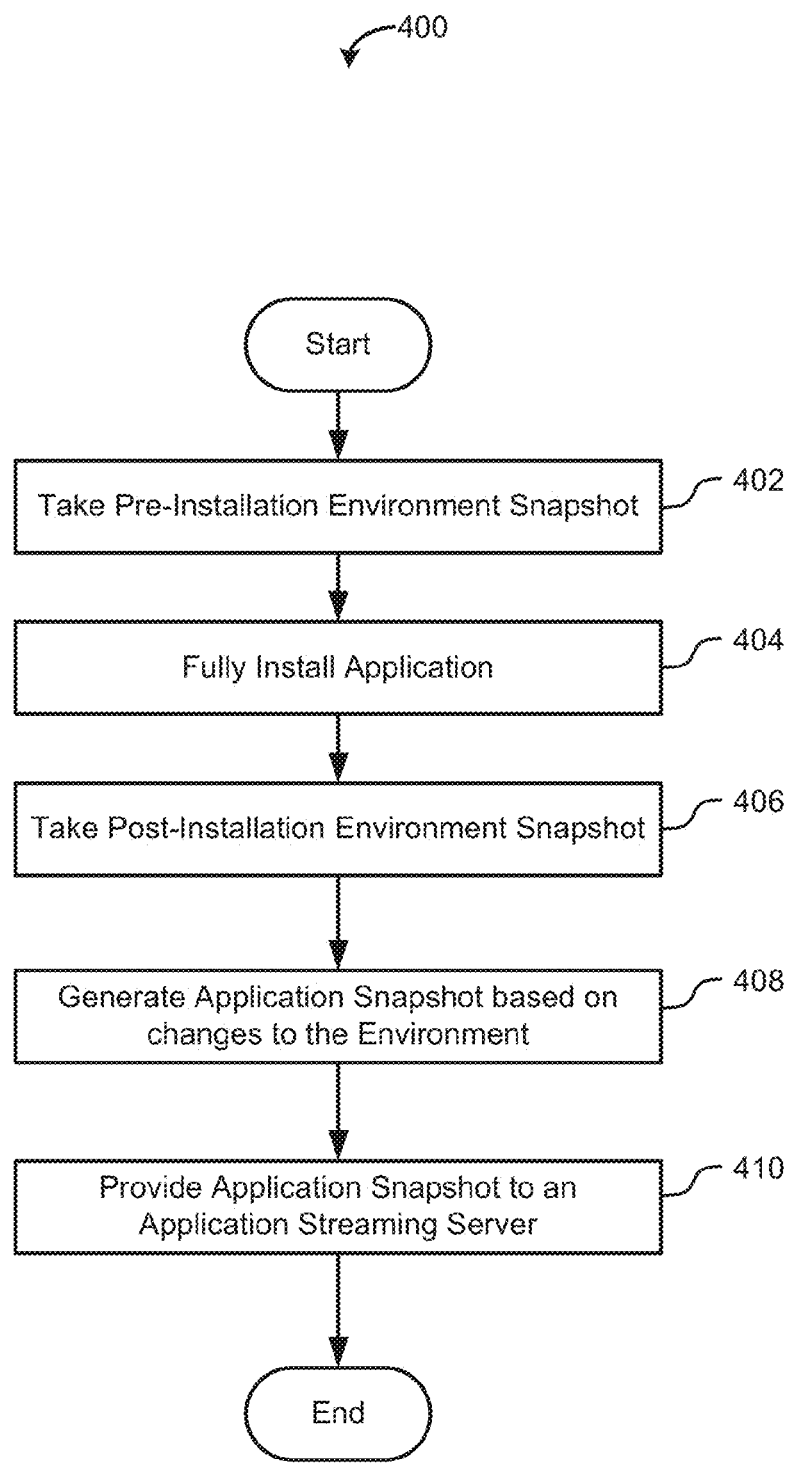
FIG. 4 depicts a flowchart of an example of a method for application streaming.

FIG. 4 depicts a flowchart 400 of an example of a method for application streaming. In the example of FIG. 4, the flowchart 400 starts at module 402 with taking a pre-installation environment snapshot of an computing environment in which an application (e.g., conventionally-coded application) will be installed. Taking a pre-installation snapshot can be optional in the sense that some environments include an adequate installation log that enables an engine to determine what changes an application have made to the computing environment when the application is installed.

In the example of FIG. 4, the flowchart 400 continues to module 404 with the full installation of the application. Due to the nature of streaming, it is important to ensure that an application streaming content consumer not crash when a request for a portion of the application (e.g., file resource of the application) is not present. Accordingly, a full installation can be needed to create an application snapshot of the application, even if the application is never fully streamed in its entirety.

In the example of FIG. 4, the flowchart 400 continues to module 406 with taking a post-installation environment snapshot of the computing environment after the application has completed installation therein. Again, taking the post-installation snapshot can be optional in the sense that some environments include an adequate installation log.

In the example of FIG. 4, the flowchart 400 continues to module 408 with determining application snapshot based on changes to the computing environment. If there is an adequate installation file, the application snapshot can be determined from the file. If not, the application snapshot can be determined at least in part from the differences in a pre- and post-installation environment snapshot. In some cases, additional processing can be required to create an application snapshot due to deficiencies in some computer self-monitoring engines.

In the example of FIG. 4, the flowchart 400 continues to module 410 with providing application snapshot to an application streaming server. The application streaming server can subsequently provide the application snapshot to an application streaming client and can provide, with the application snapshot, a compatible configuration to enable the application streaming client to request additional portions of application (e.g., file resources of the application) in the normal course of the on-client (local) execution of the application even if the file resources are not on the application streaming client. Those skilled in the art will appreciate that the portions of the application provided to the applications streaming client can be from a stream-enabled version of the application.

Figure 5:
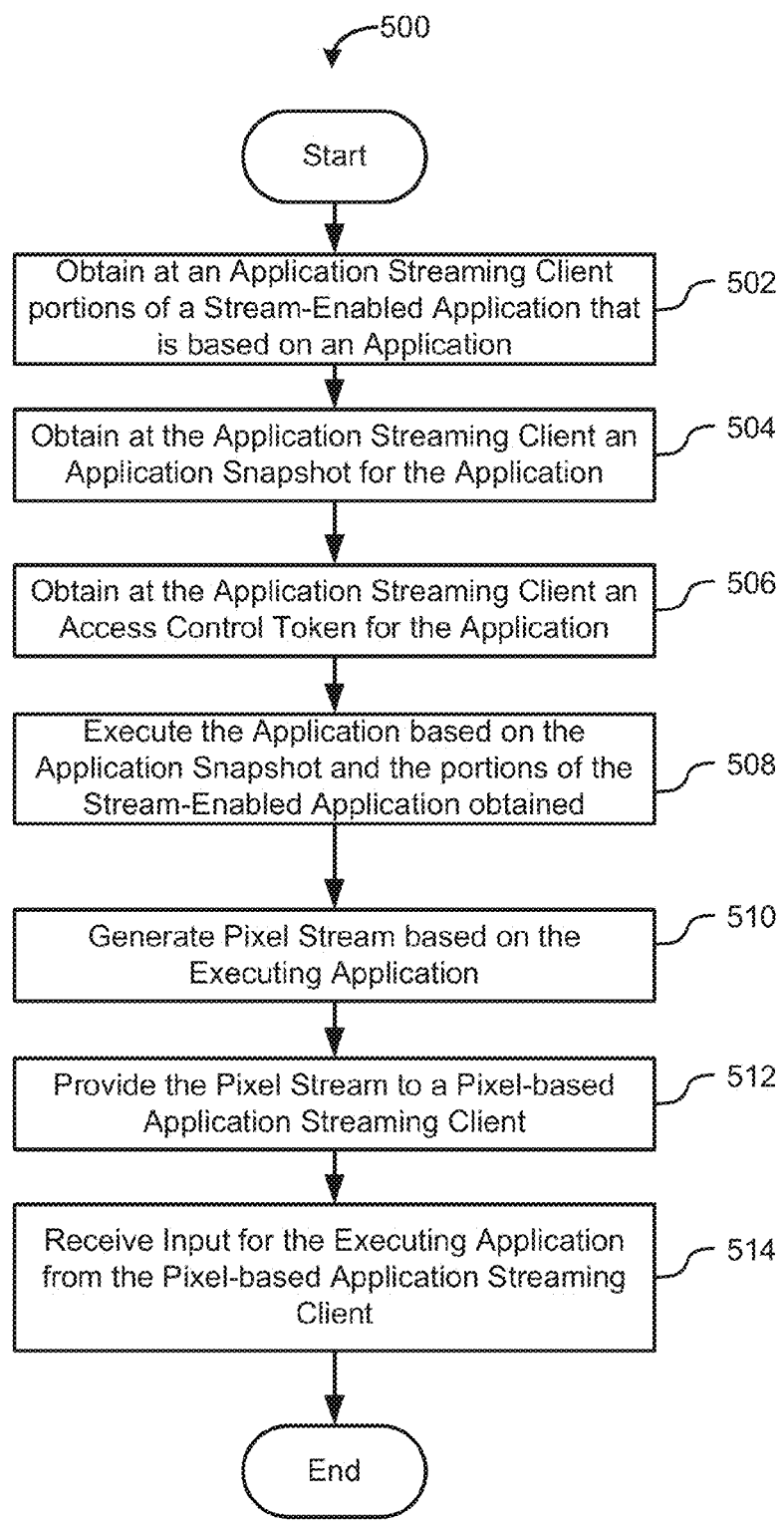
FIG. 5 depicts a flowchart of an example of a method for application streaming.

FIG. 5 depicts a flowchart 500 of an example of a method for application streaming. In the example of FIG. 5, the flowchart 500 starts at module 502 with obtaining at an application streaming client portions of a stream-enabled application that is based on an application that is to be executed (e.g., at an applications streaming client). As noted herein, a stream-enabled application is an application (e.g., conventionally-coded application) that is broken into portions (e.g., blocks, chunks, pages, etc.), such that the application can be streamed on a per-portion basis to an application streaming client and the application streaming client can execute the application based on the streamed portions.

An application streaming server can provide a subset of the portions to the application streaming client. The subset can include one or more jumpstart portions (also referred to herein as "jumpstart partials") of the stream-enabled application, prefetch portions of the stream-enabled application, predicted portions of the stream-enabled application (e.g., based on heuristics and/or portions fetches during previous executions), and/or one or more of the other portions of the stream-enabled application. For some implementations, the jumpstart portions can comprise sufficient portions of the application that permits an application streaming client to initiate execution of the application (e.g., for the first time on the application streaming client) without the remaining portions of the application. For some implementations, the portions of the application are made available after an application has been stream-enabled (e.g., broken up into portions) and the jumpstart portions have been identified (e.g., using the application snapshots).

In a specific implementation, the application streaming client can be allowed to store all of the portions of a stream-enabled application or can be prevented from storing all of the portions of the stream-enabled application to make piracy more difficult (by not making all portions of the stream-enabled application readily available in a single location), to conserve resources at the proxy, or for other reasons. For some implementations, the application client stores portions requested and obtained in a cache (e.g., for possible execution when the application streaming client is offline with respect to the application streaming server).

In the example of FIG. 5, the flowchart 500 continues to module 504 with obtaining at the application streaming client an application snapshot for the application. The application snapshot could be received from an application snapshot engine, which conceptually can be part of an application streaming server. In some implementations, the application snapshot could be provided through some other input device, such as removable storage. As noted herein, the application snapshot can enable an application streaming client to request portions of the stream-enabled application that are not already on the application streaming client (e.g., portions of the stream-enabled application that are needed in order to continue execution of the application). For some implementations, the requests for portions of the stream-enabled application could be provided by an application streaming client.

In the example of FIG. 5, the flowchart 500 continues to module 506 with obtaining at the applications streaming client an access control token for the application. The access control token can be received from an access control token server, which can conceptually be considered part of an application streaming server. In some implementations, the access control token could be provided through some other input device, such as removable storage. Generally, the access control token obtained can determine the level of access to the application to be executed by an application client server. For example, the access control token can determine whether an application streaming client can initiate execution of the application and/or continue execution of an application (e.g., past a certain time after the jumpstart portions have been received and executed).

In the example of FIG. 5, the flowchart 500 continues to module 508 with executing the application based on the application snapshot and the portions of the stream-enabled application obtained. Generally, execution of the application can be initiated at the application streaming client once the jumpstart portions of the stream-enabled application are received. For some implementations, the execution of the application could be initiated in a virtual computing environment residing on the application streaming client. For some implementations, the application streaming client can be executing the application on behalf of another client to which the application streaming client intends to provide pixel-based access to the executing application (e.g., on behalf of a pixel-based application streaming client), can be executing the application for use (e.g., by a user) at the application streaming client, or both.

Once executed, the application can continue execution of the application based on the additional portions of the stream-enabled application identified and obtained in accordance with the application snapshot. For example, the application streaming client can continue execution of the application based on the portions requested and obtained from the application streaming server necessary for the execution to not crash/halt (e.g., based on a lack of a needed file resource).

In the example of FIG. 5, the flowchart 500 continues to module 510 with generating a pixel stream based on the executing application. The pixel stream could be generated by a pixel-based application streaming server, which can receive an output (e.g., video output) from the application executing on the application streaming client.

In the example of FIG. 5, the flowchart 500 continues to module 512 with providing the pixel stream generated to a pixel-based application streaming client. The pixel-based applications streaming client can be configured to receive the pixel stream and display at the pixel-based application streaming client (e.g., through a video screen) the video output represented by the pixel stream. In doing so, the pixel-based application stream client can gain pixel-based access to the application executing on the application streaming client.

In the example of FIG. 5, the flowchart 500 continues to module 514 with receiving from the pixel-based application streaming client input for the executing application. The input received could be user-based input received at the pixel-based application streaming client in association with an application that is executing on the application streaming client (e.g., on behalf of the pixel-based application streaming client) and being pixel-streamed to the pixel-based application streaming client. User-based input received from the pixel-based application streaming client could include input received through a physical peripheral (e.g., keyboard, mouse, joystick, and the like) coupled to the pixel-based application streaming client and/or a virtual peripheral (e.g., on-screen keyboard) provided by the pixel-based application streaming client.

As discussed herein, depending on the implementation, the pixel-based access can be facilitated using existing, pixel-based remote computing technologies, such as Remote Desktop Protocol (RDP), Remote Graphics Software (RGS), and the like.

As used herein, the term "embodiment" means an embodiment that serves to illustrate by way of example but not limitation. The techniques described in the preceding text and figures can be mixed and matched as circumstances demand to produce alternative embodiments.

We claim:

1. A method comprising:
   receiving portions of a stream-enabled application from an application streaming server at an application streaming client, wherein the stream-enabled application is a stream-enabled version of a non-stream-enabled application;
   playing the stream-enabled application at an application streaming player using the portions of the stream-enabled application from the application streaming server;
   generating a pixel stream associated with playing the stream-enabled application at the application streaming player;
   serving the pixel stream from a pixel-based application streaming server coupled to the application streaming player to a pixel-based application streaming client;
   receiving user input from a user in interacting with the pixel stream as if the user is interacting with the stream-enabled application residing locally at the pixel-based application streaming client;
   playing the stream-enabled application according to the user input;
   modifying the pixel stream associated with the playing of the stream-enabled-application according to the user input.

2. The method of claim 1, further comprising receiving an application snapshot for the stream-enabled application, wherein playing the stream-enabled application includes using the application snapshot.

3. The method of claim 1, further comprising continuing playing the stream-enabled application based on subsequently received portions of the stream-enabled application.

4. The method of claim 1, wherein the pixel stream is generated from output of the stream-enabled application as the stream-enabled application is played at the application streaming player.

5. The method of claim 4, wherein the output includes a video component.

6. The method of claim 1, wherein the pixel stream is generated using output of the stream-enabled application.

7. The method of claim 6, wherein the pixel stream includes a video component.

8. The method of claim 1, further comprising receiving, at the application streaming player, input for the stream-enabled application.

9. The method of claim 8, wherein the input is received from the pixel-based application streaming client.

10. The method of claim 1, further comprising obtaining, at the application streaming client, an access control token for playing the stream-enabled application, wherein the stream-enabled application is played at the application streaming client by the application streaming player in accordance with the access control token.

11. A system comprising:
    a download engine device; an application streaming player; a pixel-based application streaming server; wherein, in operation:
    the download engine device obtains an application snapshot for an application, wherein the application snapshot enables the system to request portions of a stream-enabled application that are not on the system, wherein the stream-enabled application is a stream-enabled version of a non-stream-enabled application;
    the download engine device obtains portions of the stream-enabled application, wherein the portions of the stream-enabled application enable playing of the non-stream-enabled application;
    the application streaming player plays the stream-enabled application using the application snapshot and the portions of the stream-enabled application;
    the pixel-based application streaming server: generates a pixel stream associated with playing the stream-enabled application at the application streaming player;
    serves the pixel stream from playing the stream-enabled application to a pixel-based application streaming client;
    the application streaming player further: receives user input from a user in interacting with the pixel stream as if the user is interacting with the stream-enabled application residing locally at the pixel-based application streaming client;
    plays the stream-enabled application according to the user input;
    the pixel-based application streaming server further modifies the pixel stream associated with the playing of the stream-enabled-application according to the user input.

12. The system of claim 11, wherein the application streaming player initiates playing the stream-enabled application using the application snapshot.

13. The system of claim 11, wherein the portions of the stream-enabled application are first portions of the stream-enabled application, wherein the application streaming player continues playing the stream-enabled application using second portions of the stream-enabled application.

14. The system of claim 11, wherein, in operation, the pixel-based application streaming server generates the pixel stream based on the playing of the stream-enabled application by the application streaming player.

15. The system of claim 14, wherein the pixel stream is generated based on output from the playing of the stream-enabled application.

16. The system of claim 11, wherein, in operation, the pixel-based application streaming server receives input for the streaming application player while the stream-enabled application is played.

17. The system of claim 11, wherein, in operation, the pixel-based application streaming server receives input for the stream-enabled application.

18. The system of claim 11, wherein, in operation, the application streaming player plays the stream-enabled application in a virtual executing environment.

19. The system of claim 11, wherein, in operation, the application streaming player obtains an access control token for the stream-enabled application, and the application streaming player plays the stream-enabled application in accordance with the access control token.

* * * * *